United States Patent
Charreton

[11] Patent Number: 5,942,864
[45] Date of Patent: Aug. 24, 1999

[54] CONTROL DEVICE FOR A VARIABLE SPEED ELECTRIC MOTOR

[75] Inventor: Jean-Marie Charreton, Bouc-Bel-Air, France

[73] Assignee: SGS-Thomson Microelectronics S.A, Saint Genis, France

[21] Appl. No.: 08/601,122

[22] Filed: Feb. 14, 1996

[30] Foreign Application Priority Data

Feb. 17, 1995 [FR] France .................................. 95/02065

[51] Int. Cl.$^6$ .............................. G05B 11/28; H02J 1/02; H02P 5/40
[52] U.S. Cl. ........................... 318/254; 318/138; 318/439
[58] Field of Search .................................. 318/138, 245, 318/254, 439, 690, 695, 629, 599, 258, 269, 293, 139, 259, 696, 176, 177, 171; 363/124, 57, 41, 39; 361/18, 55, 56, 91

[56] References Cited

U.S. PATENT DOCUMENTS

| | | | |
|---|---|---|---|
| 3,609,509 | 9/1971 | Lafuze | 321/7 |
| 3,832,625 | 8/1974 | Gyugyi | 322/47 |
| 3,843,912 | 10/1974 | Anderson | 318/258 |
| 3,863,120 | 1/1975 | Rettig | 318/166 |
| 3,863,121 | 1/1975 | Rettig | 318/227 |
| 3,863,122 | 1/1975 | Rettig | 318/227 |
| 3,887,852 | 6/1975 | Fernandes et al. | 318/197 |
| 3,911,339 | 10/1975 | Rettig | 318/171 |
| 3,962,614 | 6/1976 | Rettig | 318/227 |
| 4,007,605 | 2/1977 | Denny | 318/334 |
| 4,093,899 | 6/1978 | Denny | 318/227 |
| 4,152,758 | 5/1979 | Bailey et al. | 363/85 |
| 4,162,435 | 7/1979 | Wright | 318/138 |
| 4,293,905 | 10/1981 | Opal | 363/124 |
| 4,295,083 | 10/1981 | Leenhouts | 318/696 |
| 4,329,630 | 5/1982 | Park | 318/258 |
| 4,673,851 | 6/1987 | Disser | 318/629 |
| 4,745,513 | 5/1988 | McMurray | 361/56 |
| 5,465,203 | 11/1995 | Bhattacharya et al. | 363/40 |
| 5,473,227 | 12/1995 | Arnaud et al. | 318/139 |
| 5,513,090 | 4/1996 | Bhattacharya et al. | 363/40 |

FOREIGN PATENT DOCUMENTS

| | | | |
|---|---|---|---|
| A-0 148 411 | 7/1985 | European Pat. Off. | H04B 15/02 |
| A-0 582 516 | 2/1994 | European Pat. Off. | H02P 7/638 |

OTHER PUBLICATIONS

French Search Report from French Patent Application 95/02065, filed Feb. 17, 1995.

*Primary Examiner*—Paul Ip
*Attorney, Agent, or Firm*—Wolf, Greenfield & Sacks, P.C.

[57] ABSTRACT

A device for controlling a variable speed motor includes a chopper including a switch for modulating by variable width pulses a rectified a.c. voltage. At least one winding of the motor forms, with a capacitor for filtering out the switching peaks of the switch a first cell for filtering out radio frequency perturbations generated by the switching of the switch.

23 Claims, 2 Drawing Sheets

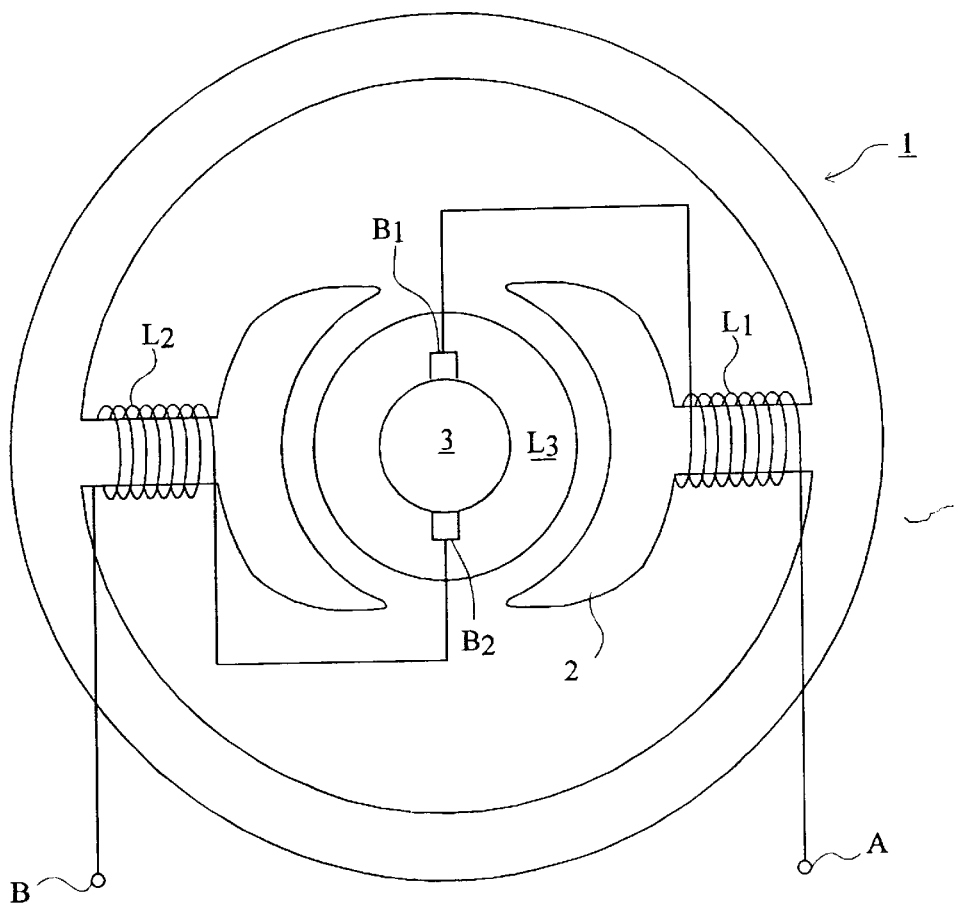
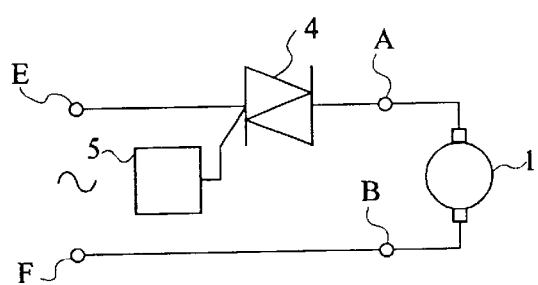
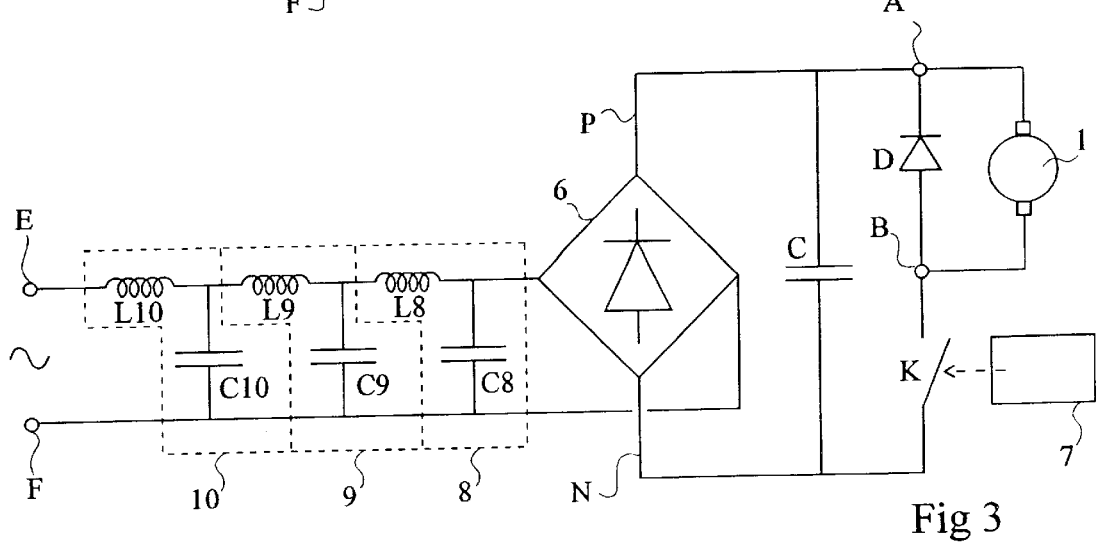

CONTROL DEVICE FOR A VARIABLE SPEED ELECTRIC MOTOR

BACKGROUND OF THE INVENTION

1. Field of the Invention

The present invention relates to a device for controlling variable speed electric motors. The invention more particularly applies to the filtering of radio frequency perturbations generated by an electric motor controlled by a chopper.

Control devices for variable speed electric motors are used, for example, in domestic appliances, such as vacuum cleaners, washing machines, drills, food processors, etc., with power consumption ranging from 100 to 1500 watts.

2. Discussion of the Related Art

FIG. 1 schematically represents a conventional electric motor. Such a motor 1 has two primary windings (or inductors) L1 and L2 associated with a stator 2 directing a magnetic field towards a rotor 3 provided with a third winding (or inductor) L3. Two supply terminals A and B of the motor 1 respectively correspond to one end of each winding L1, L2. The other end of each winding L1, L2 is connected to a brush, respectively B1 and B2, contacting the third winding L3.

Usually, such motors are controlled through an electronic circuit that periodically switches the power supply of the motor so as to fix both its power supply and its speed.

FIG. 2 is an electric diagram which represents a first exemplary device for controlling a variable speed motor such as represented in FIG. 1.

The control device includes a triac 4 having its gate connected to a circuit 5 for selecting the conduction periods of the triac 4 as a function of the desired speed of the motor 1. The triac 4 is disposed between a first terminal A of the motor 1 and a second terminal E of the a.c. mains. A second terminal B of the motor 1 is directly connected to a second terminal F of the mains.

A drawback of such a control device is that the current that flows in the windings of the motor 1 has high variations corresponding to the conduction periods of the triac 4. These high current variations are detrimental to the lifetime of the motor.

A further drawback is that the switching of triac 4 generates perturbations corresponding to harmonics of the supply frequency (for example, 50 Hz). These perturbations generate acoustic noises at the harmonic frequencies. The tolerable limits of these harmonic perturbations are imposed by various standards, for example standard CEI 1000 (EN 60555), which fix, for each harmonic of the supply frequency provided by the mains, a maximum intensity. The harmonic perturbations generated by the triac 4 exceed the limits fixed by this standard, especially for high or intermediate power values of the motor, thus of the speed. This is especially the case for some domestic appliances, for example for the motor of a washing machine during spin-drying cycles.

To reduce both the harmonic perturbations of the power supply frequency and the current variations in the motor, a control device based on a chopper operating in pulse width modulation (PWM) mode of the rectified voltage of the mains is generally used.

FIG. 3 is an electric diagram representing a second exemplary device for controlling a motor having a variable speed such as represented in FIG. 1, using a chopper operating at a fixed frequency in the PWM mode.

The a.c. voltage, drawn from terminals E and F of the mains, is rectified through, for example, a diode bridge 6. A first terminal A of the motor 1 is directly connected to a first output terminal P of the diode bridge 6. A switch K is disposed between a second terminal B of the motor 1 and a second output terminal N of the diode bridge 6. The switch K is controlled by a circuit 7 providing a pulse train at a high frequency (for example 20 kHz), the width of the pulses depending upon the desired speed of the motor 1. The switch K modulates the sine wave signal rectified by the bridge 6 so as to fix both the power supply and the speed of the motor 1. A free wheel diode D disposed between the terminals A and B of the motor 1 reduces the ripples of the current that flows in the windings of motor 1. Generally, a low value capacitor C (approximately 1 $\mu$F) is connected in parallel with the diode bridge 6, near the motor 1. The capacitor C is designed to filter the switching peaks of the switch K which is, for example, formed by a power MOS transistor.

Although such a control circuit significantly decreases the harmonic perturbations of the mains frequency, thus complying with the constraints of standard CEI 1000, even at high power, the operation frequency of the chopper (for example, approximately 20 kHz) generates radio frequency perturbations due to the switching of the switch K. Therefore, these perturbations should be filtered so that they are not conveyed through the mains.

For this purpose, filtering cells are conventionally used, for example three cells 8, 9 and 10, connected in series upstream the rectifier 6. These cells are LC cells respectively comprising capacitors C8, C9 and C10, and coils L8, L9 and L10. The number of cells generally depends upon the number of harmonics of the switching frequency of the switch K that is to be filtered out.

A drawback of such a control device is that the number of filtering cells which are required causes the device to be particularly cumbersome and expensive. Indeed, the capacitors and inductors of the LC cells should be sized so that they filter the 20-kHz switching frequency and its harmonics while withstanding the mains voltage (for example 220 volts) and intensities of several amperes because of the power of the motor. The inductances of the coils range, for example, from approximately 10 to 60 mH and the capacitances of the capacitors range, for example, from approximately 1 to 5 $\mu$F.

SUMMARY OF THE INVENTION

An object of the present invention is to avoid this drawback by providing a device for controlling a variable speed electric motor using a chopper which reduces the required number of cells for filtering out the radio frequency perturbations.

To achieve this and other objects, the present invention provides a device for controlling a variable speed motor comprising a chopper including a switch which modulates by variable width pulses a rectified a.c. voltage. At least one winding of the motor forms, with a capacitor for filtering the switching peaks of the switch, a first cell which filters the radio frequency perturbations generated by the switching of the switch.

According to an embodiment of the invention, the capacitor is disposed between an output terminal of a rectifier of the a.c. voltage and a contact brush between an end of a stator winding and a rotor winding of the motor, the switch being disposed between the terminal of the rectifier and a supply terminal of the motor.

According to an embodiment of the invention, a free wheel diode is disposed between the supply terminal of the motor and the brush.

According to an embodiment of the invention, one end of the first winding of the stator constitutes a first motor supply terminal that is connected to a first output terminal of the rectifier, and the other end of the first winding is connected to a first brush, one end of a second winding of the stator forming a second motor supply terminal is connected, through this switch, to a second output terminal of the rectifier, and the other end of the second winding is connected to a second brush.

According to an embodiment of the invention, the winding that is part of the first filtering cell is a first winding of the stator of the motor, the capacitor being disposed between the first brush and the second terminal of the rectifier.

According to an embodiment of the invention, a first stator winding, connected in series with the winding of the rotor of the motor, constitutes, with the capacitor, the first filtering cell, the capacitor being disposed between the second brush and the second terminal of the rectifier.

According to an embodiment of the invention, the winding which is part of the first filtering cell is formed by a winding of the motor's rotor.

According to an embodiment of the invention, one end of the first winding of the stator is connected to a first brush. A second brush forms a first motor supply terminal that is connected to a first output terminal of the rectifier. The other end of the first winding is connected to one end of a second winding of the stator whose other end constitutes a second supply terminal of the motor connected, through the switch, to a second output terminal of the rectifier, the capacitor being disposed between the first brush and the second terminal of the rectifier.

According to an embodiment of the invention, the value of the capacitor is selected so that the filtering cell eliminates at least the first harmonic of the modulation frequency of the chopper.

According to an embodiment of the invention, the device further includes at least a second cell for filtering out an harmonic of the modulation frequency of the chopper, upstream the rectifier.

The foregoing and other objects, features, aspects and advantages of the invention will become apparent from the following detailed description of the present invention when taken in conjunction with the accompanying drawings.

BRIEF DESCRIPTION OF DRAWINGS

FIGS. 1–3, above described, disclose the state of the art and the problem encountered;

For the sake of clarity, the same elements are designated with the same references in the various drawings.

DETAILED DESCRIPTION

The invention is based on an analysis of the structure of a motor which shows that the inducing and induced windings have an inductance having the same order of magnitude as the coils that are conventionally used in cells for filtering out radio frequency perturbations. Indeed, for a conventional 500 watt motor, the inductance of the windings are approximately several tens of a millihenry. In addition, the capacitor which filters out the switching peaks of the chopper has also the same order of magnitude as the capacitors that are conventionally used to filter out radio frequency perturbations.

In addition, the electrical connections between the inductors and the brushes are generally realized by an internal connector of the motor. The ends of the windings of the motor can therefore be separately accessed.

Thus, the invention is based on the idea of using one or more windings of a motor as an inductance for a first LC cell for filtering out radio frequency perturbations generated by the switching of a variable pulse width modulation (PWM) chopper of a rectified a.c. supply voltage.

Therefore, the first filtering cell is, according to the invention, formed by the capacitor used for filtering the switching peaks of the chopper and by one or more windings of the motor.

Preferably, the first cell so formed is the one designed to filter out at least the first harmonic of the switching frequency of the chopper. Indeed, the first harmonic filtering cell is, in conventional arrangements, the most cumbersome and expensive cell.

Thus, the invention, without impairing the speed control of the motor, imparts to two components, namely the capacitor for filtering the switching peaks and at least one winding of the motor, a second function, i.e., filtering out the radio frequency perturbations.

In this way, the size and cost of the control device are decreased by omitting one of the radio frequency filtering cells used conventionally.

Figure 4:
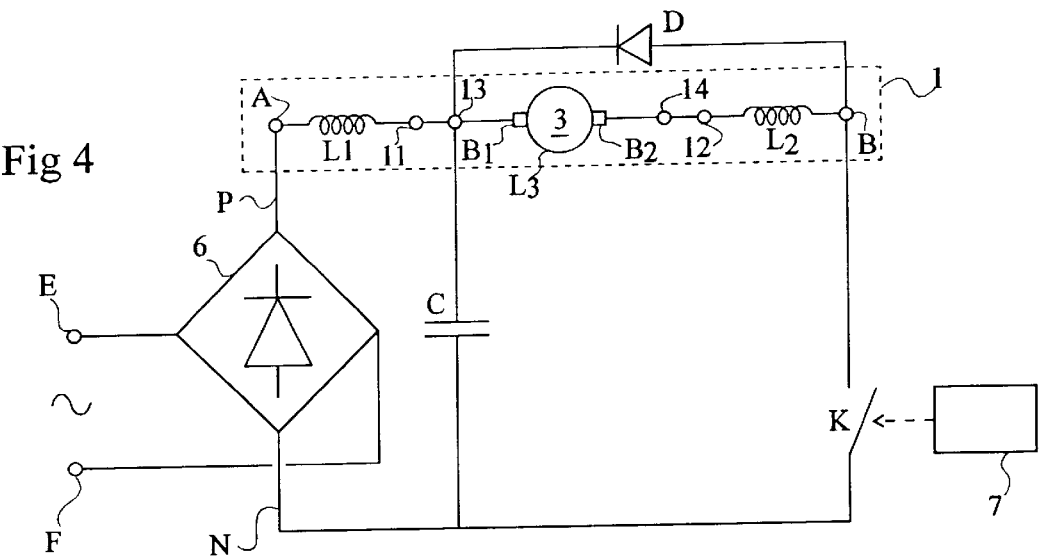
FIG. 4 schematically represents a first embodiment of a control device according to the present invention in which one of the inductors of the motor is used to form a filtering cell.

FIG. 4 illustrates a first embodiment of a control device according to the invention in which one, L1, of the stator windings, or inductors, of the motor 1 constitutes the inductance of the first cell for filtering out radio frequency perturbations.

A control device according to the invention includes, as previously, a chopper including a switch K, for example a power MOS transistor. This switch K is controlled by a circuit 7 which generates a pulse train at a fixed frequency (for example approximately 20 kHz) or at a variable frequency, the width of the pulses corresponding the desired speed of the motor 1. The chopper modulates an a.c. voltage drawn, for example, from two terminals E and F of the mains and rectified, for example, by a diode bridge 6.

According to the first embodiment represented in FIG. 4, the diode bridge 6 is interposed between the terminals of the mains and the terminals A and B of the motor 1. A first terminal A is directly connected to a first output terminal P, which is for example positive, of the diode bridge 6, the switch K being disposed between a second terminal B and a second output terminal N, which is for example negative, of the diode bridge 6.

The capacitor C, for filtering out the switching peaks of the switch K, is no longer connected in parallel with the diode bridge 6. The capacitor C is in this case disposed between the second terminal N and a first brush B1. In other words, the capacitor C is associated with the inductor L1 to form an LC cell for filtering out radio frequency perturbations.

The fact that the electrical connections between the inductors L1 and L2 and the brushes B1 and B2 are conventionally achieved with a connector, allows connections between the control device and the brushes of the motor. Thus, the invention does not require modifications of the design of a conventional motor.

The drawings show the terminals of the motor's connector and the various connections between these terminals. Thus, the ends of the winding L1 are accessible through two terminals, A and 11, respectively. The ends of the winding L2 are accessible through two terminals, B and 12, respectively. The brushes B1 and B2, respectively, are accessible through respective terminals 13 and 14.

According to the first embodiment illustrated in FIG. 4, the connections between the various terminals, seen from the motor, are conventional connections. Thus, the motor 1 is powered through terminals A and B which correspond to the free ends of the windings L1 and L2 of the stator. In other words, the output terminals P and N of the diode bridge 6 are directly connected to terminal A and, through the switch K, to terminal B, respectively. Terminals 11 and 13 are connected to each other as well as terminals 12 and 14.

In contrast, the capacitor C is no longer connected to terminal B, but is connected to terminal 13 (or 11). The freewheel diode D is, in this first embodiment, connected between terminals B and 13 (or 11).

In an exemplary implementation, for a motor having a maximum power of approximately 300 watts, the windings L1, L2 and L3 have values of approximately 60 millihenrys. A capacitor C having a value of approximately 1000 picofarad constitutes, with the winding L1, a low-pass filter which eliminates the first harmonic of a 20-kHz operation frequency of the chopper.

Figure 5:
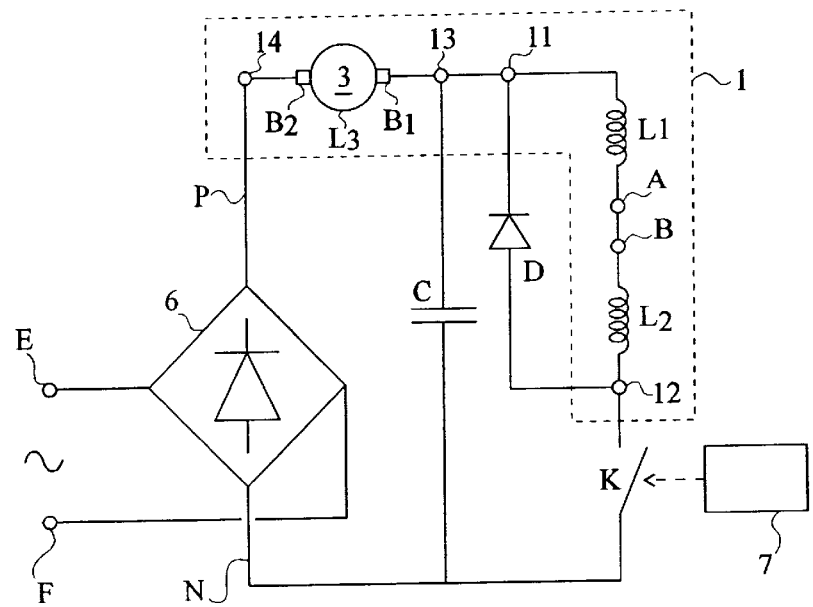
FIG. 5 schematically represents a second embodiment of a control device according to the present invention in which the induced coil of the motor is used to form a filtering cell.

FIG. 5 illustrates a second embodiment of a control device according to the invention in which the winding L3 of the rotor, or induced winding, of motor 1 constitutes the inductance of a first cell for filtering out radio frequency perturbations.

According to this second embodiment, the motor 1 is no longer powered between the terminals A and B, but between the terminals 14 and 12 which correspond to the brush B2 and to one end of the winding L2, respectively.

Thus, the terminal P of the diode bridge 6 is connected to the terminal 14 which constitutes a first supply terminal of the motor 1. The terminal N of the diode bridge 6 is connected, through the switch K, to the terminal 12 which constitutes a second supply terminal of the motor 1. The windings L1 and L2 of the stator, or inductors, are connected in series through their respective terminal A and B. The terminal 11 of the winding L1 is connected to the terminal 13 of the first brush B1. The capacitor C is, in this case, disposed between the terminal N and the terminal 13 (or 12). The freewheel diode D is parallel connected with the windings L1 and L2, i.e., between the terminals 12 and 11 (or 13).

In an exemplary implementation, for a motor having a maximum power of approximately 300 watts, the windings L1, L2 and L3 have values of approximately 60 millihenrys. A capacitor C having a value of approximately 1000 picofarad constitutes, with the winding L3, a low-pass filter for eliminating the first harmonic of a 20-kHz operation frequency of the chopper.

Figure 6:
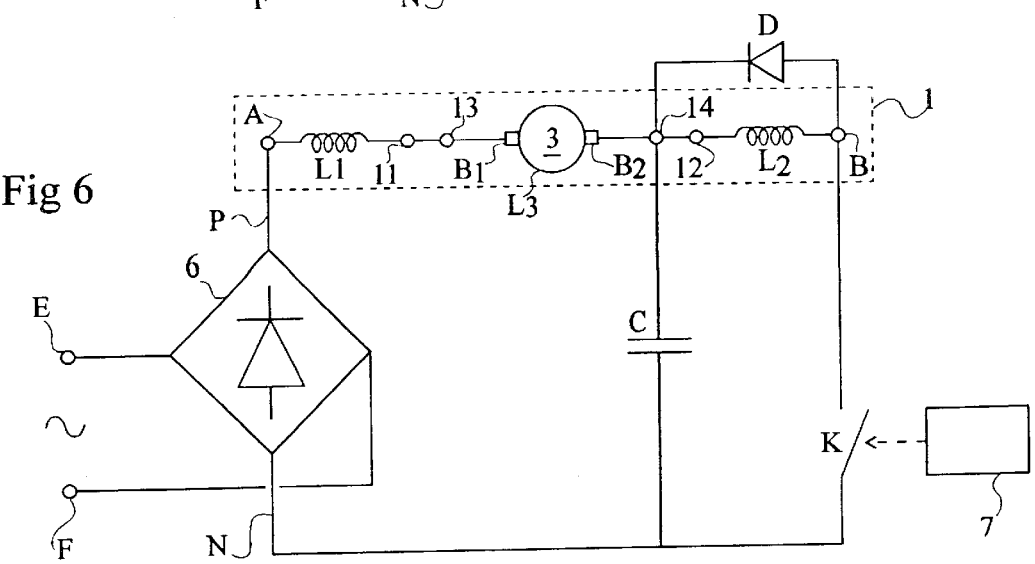
FIG. 6 schematically represents a third embodiment of a control device according to the present invention in which one of the inducted coil and the induced coil of the motor are used to form a filtering cell.

FIG. 6 represents a third embodiment of a control device according to the invention in which one, L2, of the windings of the stator and the winding L3 of the rotor constitute the inductance of the first cell for filtering out radio frequency perturbations.

The connections between the terminals of the components of the motor 1 are, as in the case of the first embodiment, conventionally realized. Therefore, the motor is powered between terminals A and B which constitute the free ends of inductors L1 and L2 of the stator. Terminals 11 and 12 are connected to terminals 13 and 14, respectively.

In contrast, the capacitor C is now connected between the terminal N of the rectifier 6 and the brush B2 that is associated with the winding L2. In other words, the capacitor C is disposed between the terminals N and 14 (or 12). The freewheel diode D is, in this third embodiment, disposed between the terminals B and 14 (or 12).

In this way, the series association of the windings L1 and L3 constitute, with the capacitor C, the first LC cell for filtering out radio frequency perturbations.

In an exemplary implementation, for a motor having a maximum power of approximately 300 watts, the windings L1, L2 and L3 have values of approximately 60 millihenrys. A capacitor C having a value of approximately 500 picofarad constitutes, with the windings L1 and L3, a low-pass filter that eliminates the first harmonic of a 20-kHz operation frequency of the chopper.

According to a fourth embodiment (not shown), the two windings L1 and L3 of the stator, or inductors, constitute the inductance of the first cell for filtering out radio frequency perturbations. The connections to realize in the connector block are deduced from the other above-described embodiments.

Although not represented in FIGS. 4–6, other filtering cells, for example for some harmonics of the pulse frequency generated by the circuit 7, may be conventionally incorporated upstream or downstream the diode bridge 6. However, for a predetermined result, the invention decreases by one the number of these filtering cells.

As is apparent to those skilled in the art, various modifications can be made to the above disclosed preferred embodiments. In particular, each of the described components can be replaced with one or more elements having the same function.

In addition, the practical implementation of the chopper, formed by the switch K and the circuit 7 which generates the variable length pulses, can be realized by those skilled in the art as a function of the range of the desired speed variation and of the power of the motor. Similarly, the selection of the connections between the various terminals of the motor 1, and of the polarity of the freewheel diode D and of the capacitor C depends upon the direction of the windings and rotation of the motor.

Furthermore, the size of the components given by way of example, in particular for the capacitors and inductances, can be modified depending upon the desired operation modes and more particularly upon the chopper's frequency.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A control device for controlling a variable speed motor, the control device including:
   a chopper including a switch controlled by variable width pulses;
   a free wheel diode;

a capacitor connected in series with said free wheel diode, said serially connected capacitor and free wheel diode connected in parallel with said switch; and an LC filtering cell including said capacitor and an inductor, wherein the inductor is formed by at least a first winding of said motor, said first winding being not connected in parallel with said free wheel diode, said LC filtering cell filtering out radio frequency perturbations.

2. The control device of claim 1, wherein the capacitance of said capacitor is selected so that the LC filtering cell eliminates at least a first harmonic of the a modulation frequency of said chopper.

3. The control device of claim 1, further including at least a second cell for filtering a harmonic of a modulation frequency of said chopper, upstream of a rectifier.

4. The control device as claimed in claim 1, further including:

a first end of said first winding being a first supply terminal of the motor and being directly connected to a first output terminal of a rectifier;

at least a second winding of said motor connected in parallel with said free wheel diode; and a first end of said second winding being a second supply terminal of the motor, said switch being connected between said second supply terminal and a second output terminal of said rectifier.

5. The control device as claimed in claim 4, wherein a rotor winding of the motor is connected by contact brushes between said first and said second windings, said first and second windings being stator windings of the motor.

6. The control device as claimed in claim 5, wherein said free wheel diode is connected between said second supply terminal and a first contact brush, said first contact brush being connected to a second end of said first winding, and said capacitor is connected between said first brush and second output terminal of said rectifier.

7. The control device as claimed in claim 6, wherein said LC filtering cell is formed by said capacitor connected to a stator winding and a rotor winding.

8. The control device as claimed in claim 5, wherein said free wheel diode is connected between said second supply terminal and a second contact brush, said second contact brush being connected to a second end of said second winding, and said capacitor is connected between said second brush and said second output terminal of said rectifier.

9. The control device as claimed in claim 1, wherein said first winding is a rotor winding of the motor connected at one end by a second contact brush to a first output terminal of a rectifier and connected at the other end by a first contact brush to two serially connected stator windings of said motor.

10. The control device as claimed in claim 9, wherein said switch is connected in series between one of said serially connected stator windings and a second output terminal of said rectifier.

11. The control device as claimed in claim 9, wherein said free wheel diode is connected in parallel with said two serially connected stator windings.

12. The control device as claimed in claim 9, wherein said capacitor is connected between said first brush and said second output of said rectifier, said capacitor being connected in parallel to said free wheel diode.

13. The control device as claimed in claim 9, wherein said LC filtering cell is formed by said capacitor connected to said rotor winding.

14. An LC filtering cell in a motor system including:

at least a first winding of a motor forming an inductance of said LC filtering cell for filtering out radio frequency perturbations, said at least first winding being not connected in parallel with a free wheel diode; and a capacitor forming with said inductance said LC filtering cell.

15. An LC filtering cell as claimed in claim 14, wherein a first harmonic is filtered by said LC filtering cell.

16. An LC filtering cell as claimed in claim 14, wherein a required number of filtering cells for filtering out radio frequency perturbations is reduced by one.

17. An LC filtering cell as claimed in claim 14, wherein said at least first winding is a stator winding of said motor.

18. An LC filtering cell as claimed in claim 14, wherein said at least first winding is a rotor winding of said motor.

19. An LC filtering cell as claimed in claim 14, wherein said at least first winding includes one stator winding of the motor and one rotor winding of the motor.

20. An LC filtering cell as claimed in claim 17, wherein at least a second winding of said motor is connected in parallel with said free wheel diode, said at least second winding includes one rotor winding of the motor and one stator winding of the motor.

21. An LC filtering cell as claimed in claim 18, wherein at least a second winding of said motor is connected in parallel with said free wheel diode, said at least second winding includes two serially connected stator windings of the motor.

22. An LC filtering cell as claimed in claim 19, wherein at least a second winding of said motor is connected in parallel with said free wheel diode, said at least second winding includes one stator winding of the motor.

23. A method for filtering radio frequency perturbations generated by an electric motor controlled by a chopper including the steps of:

forming an LC filtering cell using at least a first winding of the motor as an inductor and connecting a capacitor to the at least first winding; and filtering out at least a first harmonic of a switching frequency of the chopper using the LC filtering cell.

* * * * *